United States Patent [19]

Ward et al.

[11] Patent Number: 4,829,475

[45] Date of Patent: May 9, 1989

[54] METHOD AND APPARATUS FOR SIMULTANEOUS ADDRESS INCREMENT AND MEMORY WRITE OPERATIONS

[75] Inventors: Morris D. Ward, Garland; Kenneth L. Williams, Dallas, both of Tex.

[73] Assignee: Texas Instruments Incorporated, Dallas, Tex.

[21] Appl. No.: 892,228

[22] Filed: Aug. 1, 1986

Related U.S. Application Data

[63] Continuation of Ser. No. 746,920, Jun. 20, 1985.

[51] Int. Cl.$^4$ .......................... G11C 7/00; G11C 8/00
[52] U.S. Cl. .................. 365/78; 365/189.05; 365/189.12; 365/230.08; 365/233.5
[58] Field of Search .................. 365/233, 78, 189, 230

[56] References Cited

U.S. PATENT DOCUMENTS

| | | | |
|---|---|---|---|
| 3,896,417 | 7/1975 | Beecham | 365/221 X |
| 3,953,838 | 4/1976 | Gilberg et al. | 365/78 |
| 4,090,256 | 5/1978 | Hepworth et al. | 365/78 X |
| 4,151,609 | 4/1979 | Moss | 365/233 X |
| 4,156,288 | 5/1979 | Spandorfer | 365/78 |
| 4,525,849 | 6/1985 | Wolf | 365/221 X |

*Primary Examiner*—Stuart N. Hecker
*Assistant Examiner*—Alyssa H. Bowler
*Attorney, Agent, or Firm*—George L. Craig; James T. Comfort; Melvin Sharp

[57] ABSTRACT

A First-In First-Out (FIFO) shift register memory system (10) with a plurality of memory word registers (50) having data inputs connected to a common data-in bus (16), and a plurality of data outputs connected to a common data-out bus (22). A write address ring counter (32) is responsive to first transitions (164, 168) of a write pulses to increment to successive stages (32) therein. A plurality of latches (154) are each responsive to a second transition (166) to latch in a write address bit. The latches (154) are each enabled to write the address bit to a respective memory register (50) upon a successive first transition (168).

27 Claims, 5 Drawing Sheets

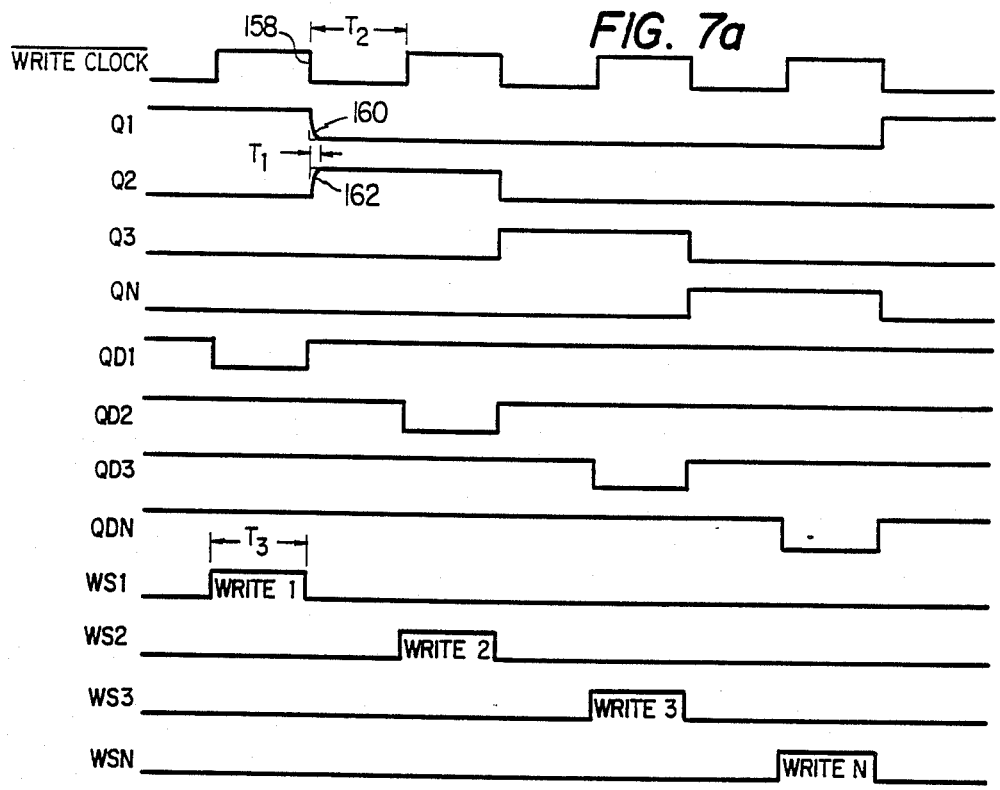
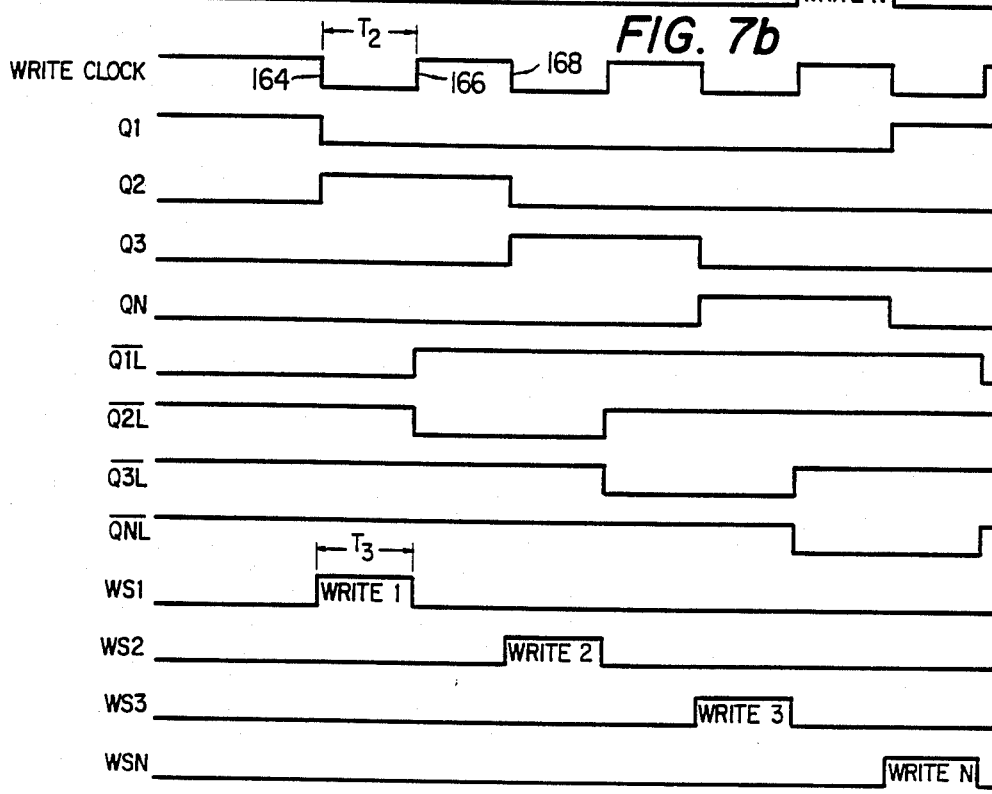

METHOD AND APPARATUS FOR SIMULTANEOUS ADDRESS INCREMENT AND MEMORY WRITE OPERATIONS

RELATED APPLICATION

This application is a continuation-in-part of copending application Ser. No. 746,920, filed June 20, 1985.

TECHNICAL FIELD OF THE INVENTION

The present invention relates in general to first-in-first-out (FIFO) memories for the asynchronous transmission of digital signals, and more particularly relates to a method and apparatus for addressing memory registers such as are included in FIFO memories.

BACKGROUND OF THE INVENTION

It is a well-known practice to employ memories as intermediate buffers between the components of a system for storing data written therein by the transmitting equipment at one speed, and read therefrom by destination equipment at another speed. Buffer random access memories have been developed which operate according to a First In First Out (FIFO) technique. In particular, copending Application Ser. No. 746,920 discloses a FIFO memory device that can be written and read within an exceptionally short period of time. This FIFO memory has a plurality of memory word locations having a common data-in bus for writing data directly into the memory locations, and a common data-out bus from which data can be directly read. A write address ring counter sequentially addresses each memory word location in response to input write commands. A read address ring counter operates similarly to sequentially read memory word locations in response to input read commands.

The write command of this FIFO memory generates a write clock pulse that comprises a first, negative-going transition and a second, positive-going transition. On the negative-going transition, the address is incremented to the next location. On the following positive-going transition, the address location to which the pointer had been incremented is written to the memory register. As will be explained in further detail below, a guard band or buffer time is generally inserted into the low side of the write cycle to avoid writing to a wrong address.

The FIFO memory of copending Application Ser. No. 746,920 writes on the high portion of an inverted write clock pulse, and increments the address pointer on the low portion of the next inverted pulse. The guard band is also on the low portion. The high portion and the low portion are generally of substantial length in order to allow the satisfactory completion of these operations. The interval between leading edges of write commands is equal to the combined length of the high and low portions.

The read cycle of this FIFO is substantially shorter than its write cycle. The maximum frequency associated with data transmission through the FIFO, or $F_{max}$, is the inverse of the longer of the minimum permissible read and write cycle, as the full FIFO can read in new data only as fast as prior data can be written out. Therefore, while the FIFO memory of the copending application represents a significant improvement in throughput time, this time can be further reduced if the minimum permissible read and write cycles are made to be more nearly the same.

SUMMARY OF THE INVENTION

The present invention discloses and claims a method and apparatus for sequentially addressing a plurality of memory registers in a short period of time. A write clock pulse is generated in response to a write command, and has first and second transitions. Upon the receipt of a first transition of the write clock pulse, the write address generator increments from a first location in a write address generator to a next location. Also on the first transition, a stored first address signal is transmitted to a memory register corresponding to the first location. Upon the receipt of a second transition of the write clock pulse, a next address signal from the next location in the write address generator is stored.

In a preferred embodiment, the address generator has outputs connected to the inputs of a plurality of transparent latches, one latch for each memory register. Each latch in turn has an output connected to one input of a respective NOR gate. The output of each NOR gate is connected to a respective memory register. A write clock line is connected to each transparent latch and an input of each NOR gate, and is also connected to each of a plurality of ring counter or address generator stages. Each ring counter stage corresponds to an address location.

A first address signal from a first stage will be stored in a first latch, responsive to a positive-going clock pulse transition. Upon the receipt of a subsequent negative-going transition, the pointed address location is incremented from a first stage to a second stage, and a second address signal is made available at an input of a corresponding second transparent latch. The negative transition simultaneously causes the first address signal stored in the first latch to be written through a respective NOR gate to a first address register. This process is then repeated for successive stages.

A prinipal advantage of the invention is that a guard band on the high portion of the clock pulse is no longer necessary. Further, since both the address generator increment and the memory write are accomplished on the low portion of the write clock signal, the high portion of the write clock signal need be no more than four or five nanoseconds in order to allow the address generator to recover between stage increments, to prevent undesirable race conditions and to stabilize the circuit. A significant time saving is thus realized, whereby the maximum permissible write cycle frequency becomes closer to the maximum permissible read cycle frequency and the FIFO memory possesses a correspondingly faster throughput of data.

BRIEF DESCRIPTION OF THE DRAWINGS

Further advantages and features of the present invention will become apparent from the description of an illustrative embodiment thereof, taken in conjunction with the accompanying drawings, in which:

FIG. 7a is a timing diagram corresponding to FIG. 6a; and

FIG. 7b is a timing diagram corresponding to FIG. 6b.

DETAILED DESCRIPTION OF THE INVENTION

Figure 1:
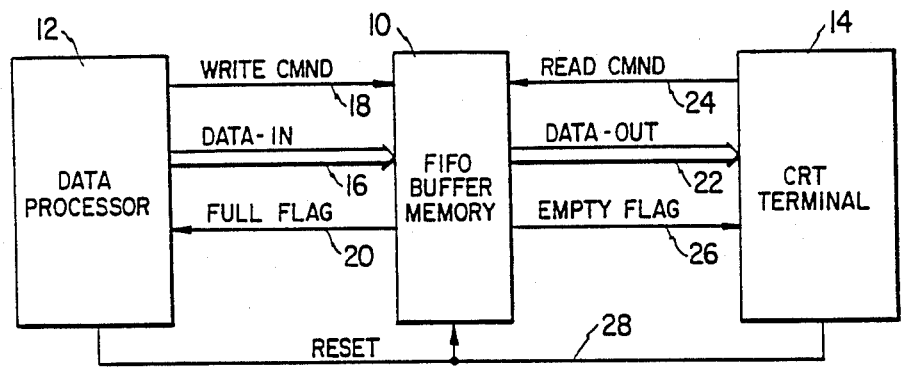
FIG. 1 is a block diagram of an environment in which the present invention may be practiced.

While the present invention may find a wide variety of applications in digital communications, FIGURE 1 is exemplary of an environment in which the invention may be advantageously practiced. The FIFO memory buffer, generally designated by reference character 10, is shown situated between a high speed data processor 12 in communication through the FIFO memory buffer 10 to a low speed cathode ray tube (CRT) terminal 14. The data communication is in the direction from the data processor 12 to the CRT terminal 14, and in the example the data processor 12 is capable of writing data into the FIFO memory buffer 10 at a rate much higher than can be ready by the CRT terminal 14. Data processors are capable of transmission rates in the neighborhood of 9600 bits per second, while typical peripheral components, such as the CRT terminal 14, may be capable of transmission rates of only 1200 bits per second.

The FIFO memory buffer 10, therefore, provides an intermediate data storage means wherein data may be written at a first rate, and read therefrom at a different rate. It should be understood, however, that the FIFO memory buffer 10 of the present invention may be used with equal effectiveness when the data write speed is slower than the data read speed. In those cases where data transmissions into the FIFO memory buffer 10, i.e., data write operations, are at rates higher than the data read operations, the primary concern is with the detection of a completely filled memory and the alerting of the data processor 12 of the same such that data transmissions can be interrupted. On the other hand, when the rate of data read operations exceeds that of the write operations the concern is with the detection of an empty FIFO memory buffer 10. In this event the CRT terminal 14 must be alerted of such status in sufficient time such that a further read command by the CRT terminal 14 does not cause the meaningless read operation of an empty FIFO memory buffer.

In practical digital data transmissions, however, both empty and full memory buffer situations may occur as short bursts of high speed data write operations may fill the buffer memory, while longer bursts of low speed data read operations may deplete the memory buffer. Therefore, irrespective of whether the originating equipment or the destination equipment is the respective high speed or low speed equipment, the FIFO memory buffer 10 can experience both empty and full statuses.

With reference again to the exemplary system of FIG. 1, since data flow is in the direction from the data processor 12 to the CRT terminal 14, a data-in bus 16 provides a transmission medium from the data processor 12 to the FIFO memory buffer 10. Accompanying the data-in bus 16 is a write command line 18 on which write commands accompany each word of data transmitted on the data-in bus 16. A full flag line 20 is provided from the FIFO memory buffer 10 to the data processor 12 for signaling the latter that the memory buffer is full. The details of this flag will be dealt with more fully below.

In completing the overall transmission path from the data processor 12 to the CRT terminal 14, a data-out bus 22 is provided from the FIFO memory buffer 10 to the CRT terminal 14. Digital data is transferred from the FIFO memory buffer 10 to the CRT terminal 14 by read commands issued by the CRT terminal 14 to the FIFO memory buffer 10 on a read command line 24. Thus, data will be read from the FIFO memory buffer 10 and output on the data-out bus 22 at the rate at which read commands appear on the read command line 24.

The empty status of the FIFO memory buffer 10 is signaled to the CRT terminal 14 via empty flag line 26. A reset line 28 is directed to the FIFO memory buffer 10 from the data processor 12 and the CRT terminal 14 for initializing the memory buffer to desired initial states.

Figure 2:
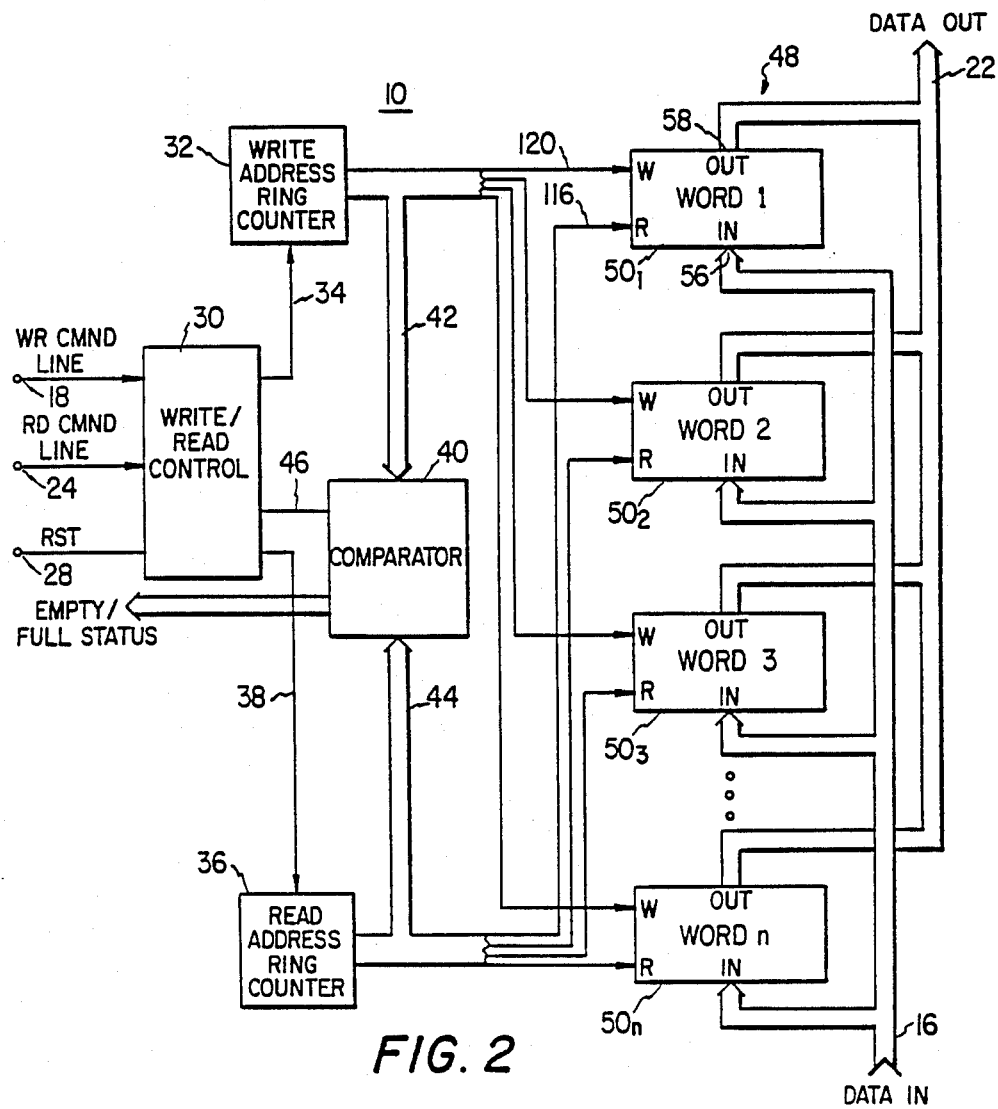
FIG. 2 is a more detailed block diagram of the invention illustrating the various functional sections of a FIFO memory buffer.

With reference to FIG. 2 of the drawings, there is illustrated the basic structural features of the FIFO memory buffer 10 according to the invention.

A write/read (W/R) controller 30 receives write and read commands respectively from the data processing 12 and CRT terminal 14 for controlling the writing and reading of a memory 48. The W/R controller 30 directs corresponding write and read signals to a multistage write address generator or ring counter 32 on write line 34, and to a multistage read address generator or ring counter 36 on read line 38. As will be discussed in more detail below, the W/R controller 30 maintains an account of whether the last memory operation command processed was a write command or a read command.

A comparator 40, comprising a plurality of logic gates, is connected to the write address ring counter 32 and the read address ring counter 36 by a respective plurality of conductors 42 and 44. The comparator 40 is also connected to the W/R controller 30 by a line 46 for signaling when the write and read address ring counters 32 and 36 point to the same address. With this information, as will be discussed in more detail below, the W/R controller 30 can determine when the memory 48 is full or empty.

The memory 48 is provided with a plurality of memory word locations or registers $50_1$ through $50_N$ which store words 1 through N. Each memory word register $50_i$ is uniquely coupled to a stage of the write address ring counter 32 to effect memory write operations of such memory register. Each memory word register is further connected to an associated stage of the read address ring counter 36 for accomplishing memory read operations. Hereinafter, a memory word location addressed during a write or a read operation is referred to as being pointed to by one of the ring counters or address generators 32 or 36. When the read address ring counter 36 points to the same memory word register $50_i$ as the write address ring counter 32, and when the last memory operation was a write operation, the memory 48 is full. Similarly, when the write and read address ring counters 32 and 36 point to the same memory word register $50_i$, and the last command received was a read command, the receipt of another read command will not be processed as the memory 48 is empty.

For example, assume that memory register $50_2$ of the memory 48 in FIG. 2 has been read and thus the read address counter 36 points to register $50_2$. Memory word registers $50_2$ through $50_N$, as well as $50_1$, can then be written with new data. When memory word register $50_1$ is written, the memory 48 is full. Moreover, the read address ring counter 36 and write address ring counter point to register $50_2$ and the last memory operation was a write operation.

Conversely, if the entire memory 48 has been written, and thus memory register $50_N$ has been written, the write address ring counter 32 will point to register $50_1$. In this situation registers $50_1$ through $50_N$ may be subsequently read wherein the memory 48 will be empty. It is seen that the memory empty status can be detected when the read and write adress ring counters 32 and 36 point to the same memory register ($50_1$), and the last memory operation was a read operation.

It should be realized that with this method the particular memory addresses need not be maintained in a table, rather all that need be retained is information relating to whether the the read and write addresses are equal (whatever they might be), and whether the last memory command processed was a read or write operation.

Figure 4:
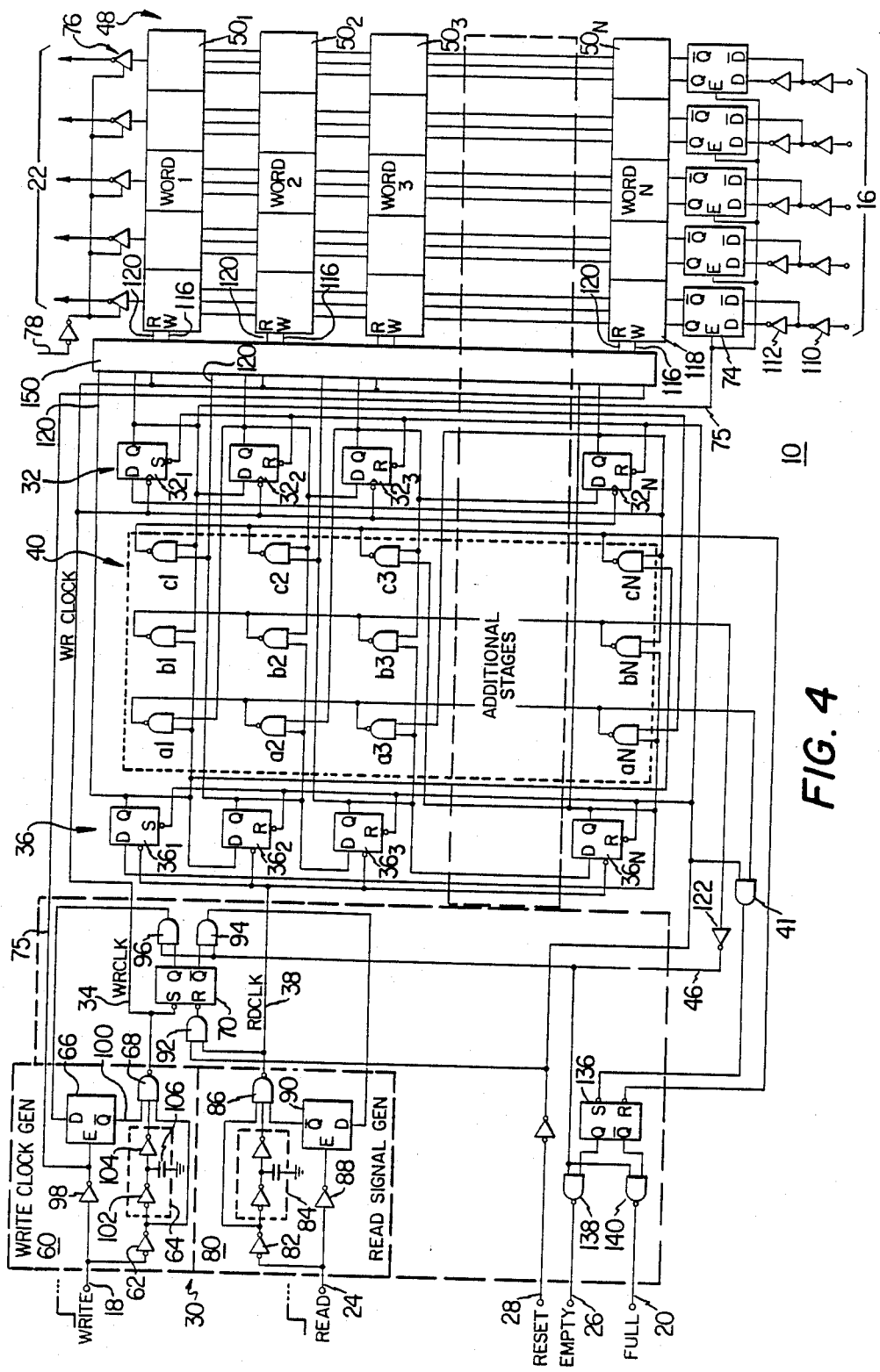
FIG. 4 is a detailed schematic diagram of the preferred embodiment of the FIFO memory buffer.

Referring again to FIG. 2, the memory word register $50_1$ has a data input 56 connected in common with the data-in bus 16. Each of the remaining word registers $50_{2-N}$ includes similar connections to bus 16. In a similar manner, each memory word register $50_{1-N}$ has a data output 58 connected in common with the data-out bus 22. Each data-in and data-out bus 16 and 22 is comprised of five bit lines corresponding to the number of data bits in a memory word (FIG. 4). In the exemplary FIFO memory buffer 10 described herein, there are N memory words for storing N number of data words, each exemplary word being five bits in length. Of course, the data words of the FIFO memory buffer 10 may be easily expanded to accommodate other popular lengths, such as eight, sixteen or thirty-two bits.

As noted above, the write address ring counter 32 includes a number of stages $32_i$, each of which is connected to WRITE CLOCK line 34 (FIG. 4). Each stage is associated with a memory word register $50_i$ and is operative to direct a write signal to such memory register. To be described in detail below, the memory 48 is read or written starting with word 1, progressing through word N, and then repeating the same sequence again.

The read address ring counter 36 is provided with similar stages for sequentially reading each of the N memory registers 50 in a similar manner. Each stage of the read address ring counter 36 is connected to the read signal line 38.

Using this technique of maintaining an account of the last memory read and write operation, and comparing of the read and write memory addresses for equality, a highly accurate determination can be made as to the full or empty status of the memory 48.

Departing from conventional practice, the cyclic operation of the FIFO memory buffer 10 relies only on the leading edge of the read and write input commands input at 18 and 24, irrespective of the timing of the trailing edge thereof. As noted above, this is highly advantageous as events which occur external to the FIFO memory buffer 10, such as changes in data on the data-in-bus 16, or nearly simultaneous read or write operations when the memory 48 is empty or full, do not result in unreliable operation of the FIFO memory buffer 10. To that end, the W/R controller 30 includes circuitry for producing, from the leading edge of the read or write commands, complete internal read and write pulses. Particularly, there is shown in FIG. 3 a simplified depiction of a write signal generator 60 of the W/R controller 30.

With this background, reference will now be made to FIGS. 3, 4 and 5 where the operation of the FIFO memory buffer 10 is shown in considerably more detail.

Figure 3:
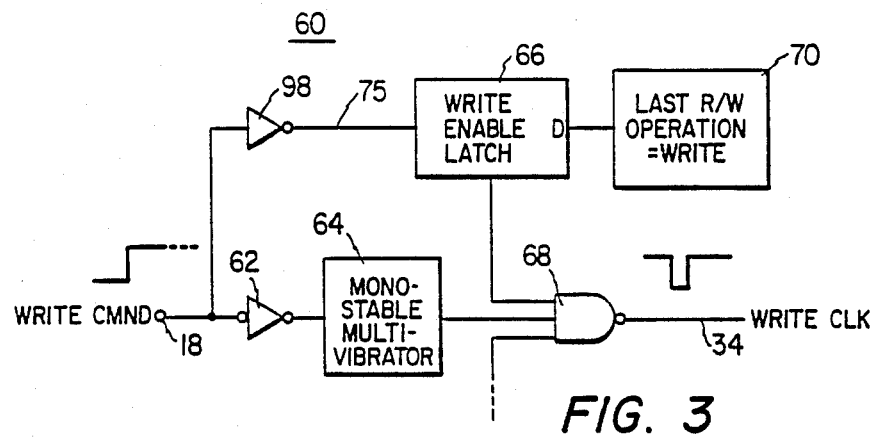
FIG. 3 is a simplified schematic illustration of a portion of the W/R controller employing a monostable multivibrator circuit for generating a write signal from a leading edge transition of an input write command.

In FIG. 3 there is shown at the input of the write signal generator 60, a waveform representing the leading edge of a write command, and at the output thereof the resulting write clock pulse denoted "WRITE CLK". A buffer gate 62 isolates the write command line 18 from the remaining FIFO memory buffer circuitry. A monostable multivibrator 64 receives at its input the same write command signal as on input 18, albeit with a gate delay. The monostable multivibrator 64 is of the type which is responsive to rising transitions for generating an output pulse. Internally or externally connected resistive and/or capacitive components (not shown) of the monostable multivibrator 64 are selected to produce an output pulse of a desired width. In the preferred embodiment of the invention, the monostable multivibrator 64 generates an output pulse of ten to fifteen nanoseconds width.

Of special significance also is the write enable latch 66 which is responsive to the leading edge of the write command, inverted by inverter 98, to inhibit the passing of a write clock pulse through NAND gate 68. It will be seen that this occurs only when the read and write address ring counters 36 and 32 point to the same memory words, and if the previous operation was also a write operation. A last W/R operation flip-flop 70 is provided to maintain an account of whether the last memory operation was a read operation of the memory 48, or a write operation. The last W/R operation flip-flop 70 is connected to the "D" input of the write enable latch 66 and provides the indication as to whether the monostable pulse should be passed through the NAND gate 68.

A read signal generator 80 of FIG. 4 is similarly responsive to the leading edge transition of read commands to produce read pulses on read line 38 when the memory 48 is not empty. Particularly, the monostable multivibrator 84 is connected to one input of a NAND gate 86. An inverter 88 inverts the read command signal and couples it to a read enable latch 90. The $\overline{Q}$ output of the read enable latch 90 is connected to an input of NAND gate 86.

In FIG. 4 there is shown a detailed electrical schematic representation of the FIFO memory buffer 10 according to the invention. In broad terms, the W/R controller 30 generates the write clock pulse signal on write line 34 and the read clock pulse on read signal line 38, in response to corresponding input commands, as long as the memory 34 is not full or empty, respectively. The read address ring counter 36 and a write address ring counter 32 each comprise a shift register with plural one-bit stages $36_{1-N}$ and $32_{1-N}$. The ring counters 32 and 36 shift a single logic high bit sequentially through the locations or stages therein for pointing to the particular memory words to be read or written.

The comparator section 40 includes plural two-input NAND gates for determining the empty and full status of the memory 48. The NAND gates $40_b$ of the comparator section 40 compare the address outputs of the read address ring counter 36 with those of the write address ring counter 32, and collectively supply an output signal to the W/R controller 30 (on line 46) for use in making a determination of whether the memory 48 is full or empty. Particularly, NAND gate $40_{b1}$ compares the output of read address ring counter stage $36_1$ with that of write address ring counter stage $32_1$. NAND gate $40_{b2}$ compares stages $36_2$ and $32_2$, and so on. Thus, NAND gates $40_b$ compare read address ring counter stages 36 with equal order write address ring counter stages 32.

The memory 48 includes an input data latch, such as latch 74, wherein input data from the data-in bus 16 is latched on the trailing edge transition of a write command signal on line 75. The data-out bus 22 comprises the output of a number of tri-state drivers 76 supplying the power for driving the data-out bus 22 directed to the destination equipment. The high impedance state control 78 for the tri-state drivers 76 is an auxiliary line also directed to the destination equipment.

The FIFO memory buffer of FIG. 4 will now be described in greater detail in connection with a typical operating cycle.

A negative pulse on reset input line 28 is provided for initializing various circuits within the FIFO memory buffer 10 to a desired state. Particularly, a signal on the reset line 28 resets the last R/W operation flip-flop 70 so that its $\overline{Q}$ output is at a logic high level. The reset line 28 is also connected to the reset input "R" of stages $36_{2-N}$ and $32_{22-N}$ of the read and write address ring counters, and to the set input "S" of stages $36_1$ and $32_1$. Each address output of ring counter stages $32_{2-N}$ and $32_{2-N}$ is thus reset to a logic low, while ring counter stages $36_1$ and $32_1$ are set to output logic high levels. The reset signal is also coupled to AND gate 41 and initially sets flip-flop 136.

A reset signal is generally instituted during or subsequent to a power up of the FIFO memory buffer 10, whereby it should be assumed that no reliable data resides within the memory 48. Thus, an initial read of the memory should be prohibited, at least until a write operation has been executed so that there is reliable data in the first memory register $50_1$. Assuming that an initial read command has indeed been issued to an empty FIFO memory buffer 10 and that the read signal generator 80 has generated a read signal at the input of NAND gate 86, it will be seen that a resulting read clock pulse does not appear on read line 38.

Since the reset line 28 has caused a logic high to appear on the $\overline{Q}$ output of the last R/W operation flip-flop 70, and assuming for a moment that the output of inverter 122 is high, AND gate 94 has logic highs on its inputs, and thus a logic high at its output. Read enable latch 90 is a D-type transparent latch of the type where the complement of the logic level appearing on its D input is transferred to the $\overline{Q}$ output, so long as the enable input E is at a logic high. When the enable input E is taken low the output will be latched at the logic level of the data that was set up at the low-going transition. Transparent latches of the SN74LS364 type manufactured by Texas Instruments Incorporated are exemplary of a latch which performs this operation.

Therefore, on the high-going leading edge transition of the input read command, the corresponding low-going transition on the output of inverter 88 will latch the complement of the logic high on the D input of transparent latch 90 as a logic low on its $\overline{Q}$ output. The logic low on such Q output is coupled to an input of the NAND gate 86.

Thus, because the read enable latch 90 has forced one input of NAND gate 86 low, such gate is inhibited from transferring any read signal generated by the monostable vibrator 84 in response to the initial read command.

However, since the Q output of the last R/W operation, flip-flop 70 has been initially set to a logic low level, AND gate 96 output will present a logic low level to the write enable latch 66. A write command inverter 98 inverts the rising edge of a write command into a negative-going edge and applies it to the E input of the write enable latch 66. This causes the logic low on the D input thereof to be presented as a logic high on the $\overline{Q}$ output to input 100 of NAND gate 68. The third input of NAND gate 68 is also a high as a result of the logic high on the output of buffer 62. Therefore, a monostable multivibrator generated write pulse will be allowed to pass through NAND gate 68.

While the write monostable multivibrator 64 is shown in block form in FIG. 3, in actual practice, it is comprised of a buffer gate 102, an inverter 104 and a timing capacitor 106. It can be seen that the positive-going pulse of a write command is presented as such by buffer gate 62 to one input of NAND gate 68. The buffered write command is also applied to the input of another buffer 102. The timing capacitor 106 prevents the input of inverter 104 from following the input of buffer gate 102, as it delays the rising edge transition until the input threshold of inverter 104 is reached, whereupon the output of inverter 104 goes to a logic low level, thereby returning the output of NAND gate 68 to a logic high. Therefore, with the foregoing circuit arrangement, the rising edge transition of the write command results in a write clock pulse on write clock line 34.

Figure 5:
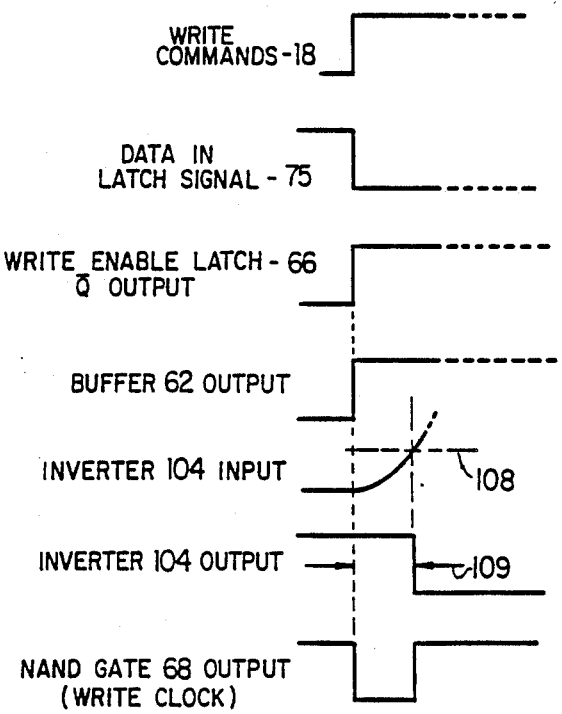
FIG. 5 is a waveform diagram of the monostable multivibrator circuit of the W/R controller.

With brief reference to FIG. 5 there is illustrated the waveforms within the W/R controller 30 which produce the write clock pulse on line 34. From the waveforms, it can be seen that as a result of the leading edge transition of the write command the output of inverter 98 goes low and, on line 75, latches the $\overline{Q}$ output of the write enable latch 66 to a logic high. Concurrently, the output of buffer gate 62 goes to a logic high level, whereby two logic highs appear on two of the NAND gate 68 inputs. Because the timing capacitor 106 at the input of inverter 104 maintains the output of such inverter at a delayed logic high, the third input of NAND gate 68 is also high, thereby generating the low-going portion of WRITE CLK. When the timing capacitor 106 charges to a voltage 108 corresponding to the input threshold of inverter 104, the inverter output will go low, as noted in the waveforms, and cause the output of NAND gate 68 to go high thereby completing the write clock pulse. Waveform dimension 109 of FIG. 5 represents the amount of time in which it takes the timing capacitor 106 to charge up sufficiently to present a logic high to the input of inverter 104 and cause the output thereof to go to a logic low level. A larger value timing capacitor 106 will result in a larger width write clock pulse on write line 34.

From the foregoing, it can be seen that the W/R controller 30 is responsive to the leading edge of the write command to produce the write clock pulse WRITE CLK. The read signal generator 80 of the W/R controller 30 is similarly constructed and is also responsive to a read command for producing the READ CLK pulse on read line 38.

Also in response to write commands, the output of inverter 98 is a low-going transition on line 75 which latches the digital data then existing on the data-in bus 16 on the respective transparent data input latches 74. Buffer inverters 110 receive the five data bits of each data word transmitted on the data-in bus 16 and convert the transmission line voltages into digital signals compatible with the circuit voltages of the FIFO memory buffer 10. The outputs of the buffer inverters 110, along with that of inverters 112 present each data bit, and its complement, to the respective input data latches 74. With this circuit arrangement, the digital data then existing on the data-in bus 16 is latched at the beginning of a write cycle into the input data latches 74. This is advantageous as any change in the digital data on the data-in bus 16 occurring immediately before or subsequent to the leading edge transition of the write command is ignored.

The Q output of each stage $32_i$ is connected as an input to block 150, which conceptually is operative to address a pointed-to memory register $50_i$. Read signal lines 120 pass through block 150 and serve as read address inputs of registers $50_1$–$50_N$. Block 150 further has as outputs a plurality of write signal lines 116, which are each operative to transmit a write address signal to a respective register $50_i$. A WRITE CLOCK line 34 is output from NAND gate 68, and connects each of several stages, to be later described, of block 150. Each stage of block 150 is also connected to a Q output of a respective ring counter stage, and a write signal line 116. The details of block 150 vary from the structure shown in copending Application Ser. No. 746,920, and will be more particularly described below with the aid of FIGS. 6a, 6b, 7a and 7b.

Figure 6B:
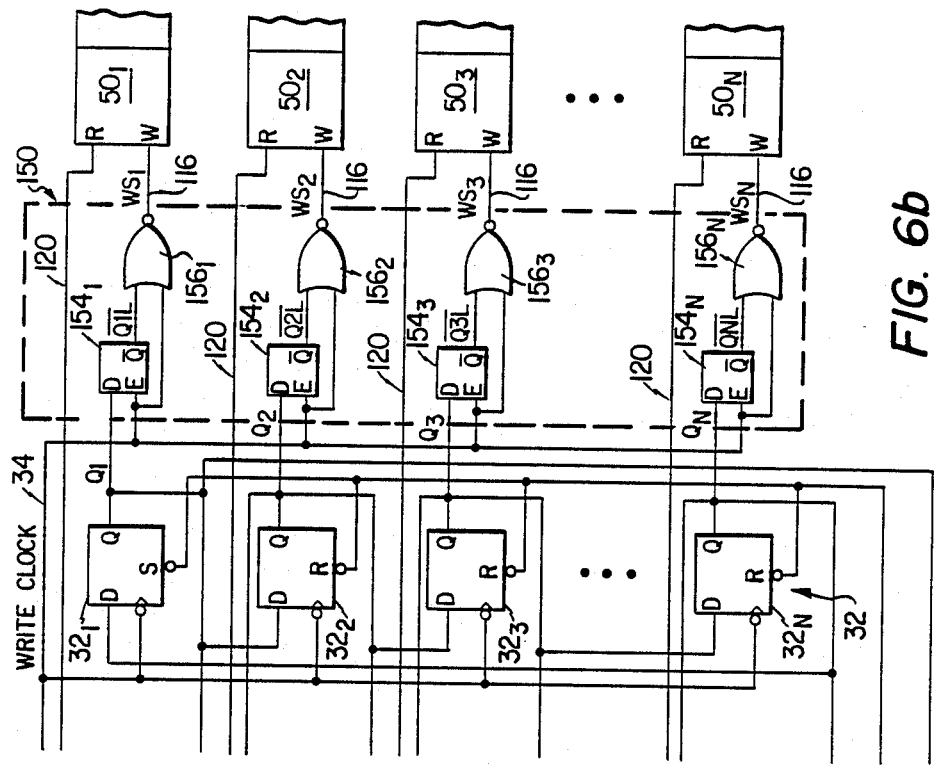
FIG. 6b is a detailed schematic diagram of the write circuitry block shown in FIG. 4, according to the present invention.
Figure 6A:
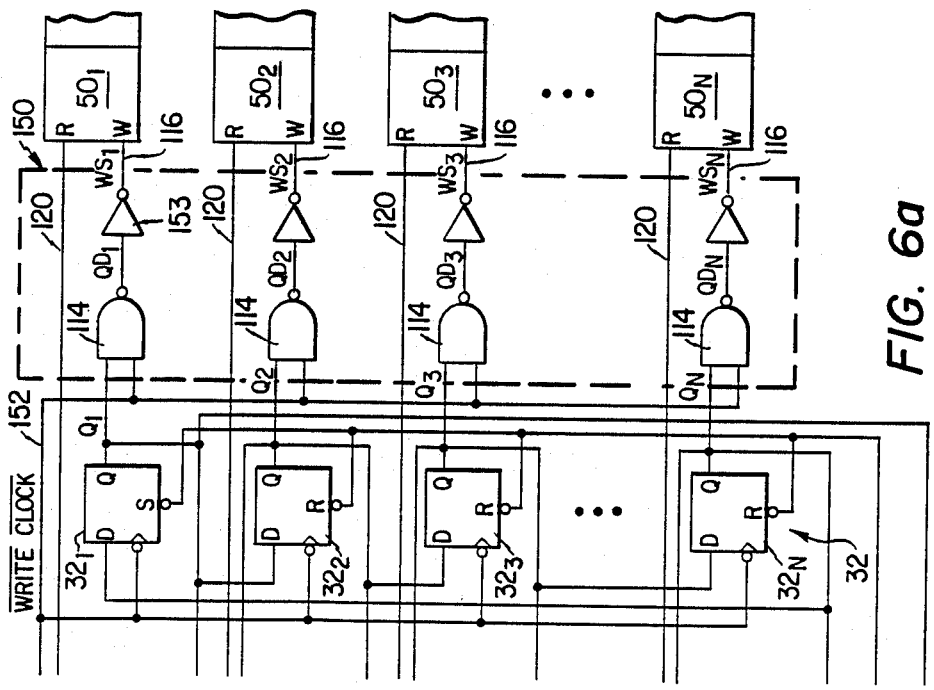
FIG. 6a is a detailed schematic diagram of the write circuitry block shown in FIG. 4, according to copending Application Ser. No. 746,920.

Turning to FIG. 6a, write control circuitry according to the structure shown in copending Application Ser. No. 746,920 is described. The inverted write clock pulse ($\overline{WR\ CLK}$) on line 152 simultaneously clocks each register stage $32_i$ of the write address ring counter 32. $\overline{WR\ CLK}$ is the inverse of the WR CLK pulse appearing on line 34 (FIG. 4); WR CLK is transformed into $\overline{WR\ CLK}$ by an inverter (not shown). The Q outputs of each write address ring counter stage $32_1$–$32_N$ are connected to the D inputs of the adjacent higher order stage, except for the Q output of stage $32_N$ which is connected back to the D input of the first stage $32_1$. Therefore, on the low-going transition of $\overline{WR\ CLK}$, the logic high on the output of stage $32_1$ ($Q_1$; obtained from the reset) will be shifted through to the output ($Q_2$) of stage $32_2$. The Q output appears as an input of NAND gate 114, as does $\overline{WR\ CLK}$.

Using as an example $Q_1$, when both $\overline{WR\ CLK}$ and $Q_1$ are high, NAND gate 114 will produce a low output on line QD1, which is input to an inverter 153. Inverter 153 inverts the QD1 input to a high signal on write signal line $WS_1$. The positive-going transition of the positive pulse on line $WS_1$ begins the writing of the five data bits latched within the input data latch 74 into the corresponding cells or bit positions of the memory word $50_1$.

Referring to FIG. 7a, a timing diagram associated with FIG. 6a is illustrated. Stages $32_i$ are sensitive to the negative going transition of a $\overline{WR\ CLK}$ pulse, and thus the generator or ring counter increments from stage $32_1$ to stage $32_2$ at time 158. This causes the Q1 output to go low and the Q2 output to go high. The Q1 and Q2 transitions are not instantaneous, but exhibit curves 160 and 162. During a certain period $T_1$, Q2 will have increased above a certain threshold for the NAND gate $114_2$ to sense a high input, but Q1 will not have decayed below this threshold for gate $114_1$. Q1 and Q2 will, therefore, both present highs to their respective NAND gates during period $T_1$.

The period between $\overline{WR\ CLK}$ pulses is here represented as $T_2$. $T_2$ varies according to when the leading edge of a write command is next received on line 18 (FIG. 4). If $T_2$ is less than or equal to $T_1$, a contention will occur between respective NAND gates 114, and therefore memory registers $50_1$ and $50_2$, as to which memory register is being addressed. $T_2$ must therefore always be greater than $T_1$ plus a guard band. In practicing a FIFO memory structure fabricated according to the most recent technology, it has been found that $T_2$ should never be less than about 10 nanoseconds. The length of write signal pulse $WS_1$, designated in FIG. 7a as $T_3$, is controlled by the $\overline{WR\ CLK}$ positive pulse and thus, ultimately, by the size of the capacitor 106 in monostable vibrator 64. It requires about 20 nanoseconds to write from latches 74 to one of memory registers $50_i$ and therefore $T_3$ should never be less than this duration. The sum of $T_2$ and $T_3$ determines the minimum interval between positive transitions of adjacent write command pulses received on line 18 (FIG. 4). In a FIFO memory embodying the most recent semiconductor device technology, this interval is limited to no less than 30 nanoseconds. The maximum writing transmission frequency is $1/(T_2+T_3)$, or about 33 Megahertz. The operating frequency $F_{max}$ of the FIFO memory is the lesser of the maximum read frequency and the maximum write frequency. Since the write frequency is about half the read frequency in this structure, the maximum write frequency will determine $F_{max}$.

Turning now to FIGS. 6b and 7b, write clock circuitry and timing diagrams according to the invention are shown and described. The ring counter stages $32_1$–$32_N$ are connected as in FIG. 6a, except that each state $32_i$ is connected to WR CLK line 34 instead of $\overline{WR\ CLK}$ line 152. However, the Q output of each stage $32_i$ is connected to the D input of a respective transparent latch $154_i$. Each transparent latch $154_i$ has an E input connected to WR CLK line 34, and a $\overline{Q}$ output connected to an input of a respective NOR gate $156_i$. WR CLK serves as the other input of each NOR gate $156_i$. The output of each NOR gate $156_i$ is a write signal line 116 that connects to a respective memory register $50_i$.

In operation, a negative transition 164 (FIG. 7b) causes the ring counter to transfer a write bit from stage $32_1$ to $32_2$, thus incrementing the pointer from location 1 to location 2. Q1 will go low and Q2 will go high, and these values will be presented to the respective D inputs of transparent latches $154_1$ and $154_2$. The previous positive transition caused a high Q1 bit to be latched into transparent latch $154_1$, and the inverse of it therefore appears at this time on output line $\overline{Q1L}$. Upon the receipt of negative transition 164 by NOR gate $156_1$, a positive write address bit will be passed to memory register $50_1$. Thus, negative transition 164 causes the address generator to increment from a first location to the next location while at the same time actuating the addressing of the first memory register.

The next positive transition of WR CLK is indicated at 166. This clocks in Q1 (now 0) into transparent latch $154_1$, and Q2 (now 1) into latch $154_2$. $\overline{Q1L}$ goes high and $\overline{Q2L}$ goes low in response. When negative transition 168 is received by NOR gate $156_2$, a "1" address bit will be passed to memory register $50_2$. The cycle then repeats, until finally a high address bit from stage $32_N$ and latch $154_N$ is passed to memory register $50_N$ at the same time that the write ring counter is incremented to stage $32_1$.

The present invention saves memory write time in two ways. First, the address generator increment and the memory write operations are both done on the low side of WR CLK. $T_2$ and $T_3$ will therefore occur at the same time, and only the latter of them need be considered in determining $F_{max}$. This is of course $T_3$, which is about 20 nanoseconds. Second, since $T_3$ is a fairly long period, no contention between NOR gates is possible. For example, referring to FIG. 7b, $\overline{Q1L}$ and $\overline{Q2L}$ will have long since settled into their new states before negative WR CLK transition 168 begins. Thus, no guard band is necessary. The positive pulse of WR CLK need only be long enough to allow stages $32_i$ to recover from the previous increment, and to prevent undesirable race conditions from occurring elsewhere in the circuit. Such a pulse may be as small as four to five nanoseconds. In a preferred embodiment, the write frequency, and therefore $F_{max}$, can be as high as $1/(20+5)ns=40$ Megahertz. Thus, the speed of the entire FIFO memory is substantially increased.

Referring back to FIG. 4, each bit storage area 118 of memory register $50_i$ is a cross-coupled latch of the type wherein a logic high level at the respective read and write input thereof effects a corresponding read or write of all bits within the memory word register $50_i$. The cross-coupled latches forming each bit cell 118 of the memory word registers $50_1$-$50_N$ are of conventional design.

As noted above, the signal applied to reset line 28 initializes the read and write address ring counters 36 and 32 by setting the Q outputs of stages $36_1$ and $32_1$ to logic high states, and by resetting the other stages so that the output states thereof are logic lows. The bit cells of each memory word register 50 are constructed such that a read operation is executed when the memory read signal line 120 is at a logic high state. A write operation is executed during the presence of a high stage on a line 116.

In keeping with the invention, the memory 48 can be considered empty or having unreliable data after having been reset by the reset 28. Accordingly, a subsequent read, without an intervening write operation, should be prohibited as the reading of the empty memory results in invalid data. A comparator NAND gate $40_{b1}$ has inputs connected to the outputs of read and write address ring counter stages $36_1$ and $32_1$, and thus after initialization the output of NAND gate $40_{b1}$ is at a logic low. This logic low is coupled to the input of inverter 122, which in turn couples a logic high to the input of AND gates 94 and 96 of the last R/W operation flip-flop 70. As described above, this prevents an initial read command from being processed.

During the reset 28, the Q output of last R/W operation flip-flop 70 was set to a logic low, which logic low is coupled through AND gate 96 and appears at the D input of write enable latch 66. On the negative transition of the E input to such latch 66, the logic low at the D input appears as a logic high on the $\overline{Q}$ output thereby enabling an initial write command to be processed through the write signal generator 60. The write clock pulse generated appears on line 34 and thus sets the Q output of the R/W operation flip-flop to a logic high, as well as clocks the write address generator 32. Because the Q output of each write address ring counter stage is connected to the D input of the adjacent higher order stage, the logic high which was initially set into the write address ring counter $32_1$ shifts through each register stage position on negative transitions of successive WR CLK pulses on line 34. Therefore, on the occurrence of a write command, memory word location $50_1$ is written at the same time that the logic high, which was initially on the Q1 output of write address ring counter stage $32_1$, is shifted to the Q2 output of counter stage $32_2$.

Subsequent write and read operations, in that order, are permitted as each comparator NAND gate $40_{b1}$-$40_{bN}$ will have one input thereof at a logic low, thereby presenting a logic high level to inverter 122. The output of inverter 122, in turn, applies a logic low on line 46 to AND gates 94 and 96, and thus a low to the D inputs of write and read enable latches 66 and 90. As a result, the $\overline{Q}$ outputs of both such latches 66 and 90 are logic highs thereby allowing further write and read operations.

Indeed, subsequent write and read operations can occur, and can even be executed simultaneously as long as the write address ring counter 32 advances ahead of the read address ring counter 36. Simultaneous read and write commands can be processed by the FIFO memory buffer 10 as the write circuitry is entirely independent of the read circuitry, provided that the same memory word register is not pointed to by the read and write address ring counters 36 and 32. When, however, such condition exists, the last R/W operation flip-flop 70 dominates over the AND gates 94 and 96, wherein the independence of the read and write operations is changed. This is seen as when the same memory word register is addressed by the read and write address generators 36 and 32, the output of inverter 122 is high, whereby the low on the $\overline{Q}$ or Q output of the last R/W operation flip-flop 70 will dictate whether the read signal generator 80 or the write signal generator 60 will be enabled through respective transparent latches 90 or 66.

It can be seen therefore that the last R/W operation flip-flop 70, which accounts for the last operation of a read or write command, together with the comparator 40, which detects when the read and write address ring counters 36 and 32 point to the same memory word, assures that memory words will not be read when the memory is empty and will not be written when full. Also operating in conjunction with the last R/W operation flip-flop 70 are the read and write signal generators 80 and 60 which provide a positive lockout of read and write commands in the event the processing of such commands would have resulted in the reading of an empty memory or the writing of a full memory.

The empty or full status of the memory 48, as detected by the comparator section 40, is signaled to other equipment by outputs 26 (EMPTY) and 20 (FULL). The circuit for signaling the empty/full status of the memory 48 is connected as follows.

NAND gate $40_{a1}$ compares read address ring counter stage $36_1$ with the higher order write address ring counter stage $32_2$. NAND gate $40_{a2}$ compares read counter stage $36_2$ with higher order write stage $32_3$, and so on. With this scheme, NAND gates $40_a$ compare read address ring counter stages 36 with respective higher order write address ring counter stages.

NAND gate $40_{c1}$ compares the output of write address ring counter stage $32_1$ with the output of higher order read address ring counter stage $36_2$. NAND gate $40_{c2}$ compares write stage $32_2$ with higher order read stage $36_3$, and so on. Thus, NAND gates $40_c$ compare write address ring counters 32 with respective higher order read address ring counter stages 36.

The output of each NAND gate $40_a$ is connected in common and to an AND gate 41. The other input of AND gate 41 is connected to a RESET signal line. The output of AND gate 41 is connected to the set input of a flip-flop 136. Similarly, the output of each NAND gate $40_c$ is connected in common and to the reset input of flip-flop 136.

The output of inverter 122 is connected to an input of NAND gates 138 and 140. The Q and $\overline{Q}$ outputs of flip-flop 136 are connected respectively to another input of NAND gates 138 and 140. Finally, the output 26 of NAND gate 138 signals the EMPTY status of the memory 48, and the output 20 of NAND gate 14 signals the FULL status.

In operation, when NAND gates $40_a$ and $40_c$ of the comparator section 40 respectively detect the nearly empty or nearly full status of the memory 48, flip-flop 136 is correspondingly reset or set. By this it is meant that when only one memory word location remains available to be written into, NAND gates $40_c$ are operative to reset flip-flop 136. Conversely, when only one memory word location remains available to be read, NAND gates $40_a$ become operative to set flip-flop 136. Furthermore, when the noted last memory word location has indeed been written or read, NAND gates $40_b$ are operative to enable NAND gates 138 and 140. The enabling of NAND gates 138 and 140 permit flip-flop 136 outputs to pass a full or empty indication to external apparatus via the FULL line 20, or EMPTY line 26.

As an example of the foregoing, assume the output of read address ring counter stage $36_2$ is a logic one, and thus points to memory word location $50_2$; and that the write address ring counter stage $32_3$ similarly points to memory word location $50_3$. This is representative of a condition in which memory word $50_2$ is the last memory word written, and the next to be read, i.e., an almost empty condition. Thus, the inputs of NAND gate $40_{a2}$ will both be high, the output thereof will couple a low to AND gate 41 which, in turn, will set flip-flop 136. As a result, when, and if, memory word location $50_3$ is read, NAND gate $40_{b3}$ will find equality between stages $36_3$ and $32_3$, and thereby enable gate 138 to signal an EMPTY condition on output 26.

With regard to an example of a memory full condition, assume the output of write address ring counter stage $32_2$ is a logic one, and thus points to memory word location $50_2$; and that the read address counter stage $36_3$ similarly points to memory word location $50_3$. This is representative of a condition in which memory word $50_2$ is the last memory word read, and the next to be written, i.e., an almost full condition. Thus, the inputs of NAND gate $40_{c2}$ will both be high, and the output thereof will couple a low to the reset input of flip-flop 136. Such flip-flop will accordingly be reset and place a logic high on one input of gate 140 in anticipation of a full condition. Indeed, if another write operation occurs and the read and write stages $36_3$ and $32_3$ point to memory word location $50_3$, NAND gate $40_{b3}$ will enable gate 140, whereupon a logic low will signal a FULL condition on output 20.

From the foregoing, a zero fall-through time asynchronous FIFO buffer memory, with nonambiguous empty or full status, has been provided. A comparator detects when a memory word is subject to being written or read, while a last R/W operation flip-flop maintains an account of whether the last memory operation was a read operation or a write operation. A read signal generator and a write signal generator are responsive to the leading edge transition of respective input read commands and write commands to generate internal read and write pulses. The read signal generator is also responsive to the comparator section and the last R/W operation flip-flop to prevent the internal generation of a read signal if the read and write address ring counters point to the same memory word, and also if the last operation was a memory read operation. Similarly, the write signal generator, in conjunction with the comparator section and last R/W operation flip-flop, prevents the generation of a write signal if the counters point to the same memory word and if the last operation was a write operation.

Improved write circuitry is disclosed, whereby the memory write operation and the address generator increment operation are both effected by a negative transition of a WRITE CLOCK pulse. The write method and circuitry of the invention are advantageous in that they obviate possible address contention and increase the maximum operating frequency of the FIFO memory.

While the preferred embodiment of the method and apparatus have been disclosed with reference to specific logic structures, it is to be understood that many changes in detail may be made as a matter of engineering choices without departing from the scope of the invention as defined by the appended claims. Also, it is not necessary to adopt all of the various advantageous features of the present disclosure into a single composite FIFO memory buffer in order to realize the individual advantages. Accordingly, such features are individually defined in some of the claims which follow.

What is claimed is:

1. A method for sequentially addressing a plurality of memory registers using a write pulse with first and second transitions, comprising:
 applying an input data signal to said plurality of memory registers;
 incrementing a write address generator in response to a first negative transition of the write pulse;
 simultaneously applying a previously stored address signal to a preselected one of said memory registers in response to the first negative transition such that said input data signal is written into said preselected memory register; and
 storing a next address signal from the write address generator in response to a second positive transition of the write pulse.

2. The method of claim 1, and further including the step of:
 ceasing to apply the address signal to the memory register in response to the second transition.

3. The method of claim 1, wherein said address generator comprises a plurality of locations including a first location and a second location, said step of incrementing the write address generator comprising the step of:
 clocking the generator to shift a logic "1" bit from the first location to the second location.

4. The method of claim 1, wherein the step of applying the stored address signal comprises the steps of:
 applying an inverse of the previously stored address signal to a first input of a NOR gate having an output coupled to the memory register, in response to a second transition of a previous clock pulse; and applying the first transition to a second input of the NOR gate in order to transmit said address signal to the memory register.

5. A method for sequentially writing data to a plurality of memory registers and concurrently incrementing an address generator storing a plurality of write address bits in respective locations, each location coupled to a respective latch, the method comprising the steps of:
storing an address bit in a first latch in response to a positive-going transitional edge of a clock signal;
incrementing the address bit from a first location to a second location in response to a negative-going transitional edge of the clock signal;
writing the stored address bit from the first latch to a preselected memory register in response to the negative-going transitional edge;
storing the address bit in a second latch in response to a next positive-going transitional edge of the clock signal;
ceasing to write the address bit stored in the first latch in response to said next positive-going transitional edge; and
repeating the above steps for subsequent locations, latches and memory registers.

6. The method of claim 5, wherein said address generator is a ring counter having first and last locations, the method including the step of:
storing the address bit in a last latch in response to a positive-going transitional edge;
incrementing the address bit from the last location to the first location in response to a negative-going transitional edge; and
writing the stored address from the last latch to a memory register in response to the negative-going transitional edge.

7. The method of claim 5, and further comprising the step of:
generating the write clock signal from leading edges of a plurality of write command pulses.

8. The method of claim 5 wherein each said respective latch is a transparent latch, the method further including the steps of:
loading an address bit into a transparent latch in response to a positive-going transitional edge of the clock signal;
passing an inverse of the address bit from the latch to a NOR gate in response to a successive negative-going transitional edge of the clock signal; and
writing the address bit from an output of the NOR gate to a memory register in response to a negative-going transitional edge of the clock signal.

9. A method of writing data into a plurality of memory registers in a first-in first-out memory, while concurrently clocking from a first stage of a write address shift register of the memory to a next stage of the write address shift register, comprising:
forming a plurality of clock pulses each having a preselected width and first and second transitions of opposite polarities, in response to leading edges of successive write commands;
storing an address bit in a transparent latch coupled to the first stage in response to a second transition;
passing the address bit to a memory register responsive to a successive first transition; and
clocking the shift register from the first stage to the next stage responsive to the first transition.

10. The method of claim 9, wherein the first transitions are negative-going and the second transitions are positive-going.

11. The method of claim 9, and further including the steps of:
selecting the preselected width in order to allow the shift register to recover between first transitions; and
selecting a maximum transmission frequency of the first-in first-out memory as equal to inverse of time to address memory plus recovery time of address generator.

12. Apparatus for sequentially addressing a plurality of memory registers, comprising:
a clock signal source operable to transmit clock pulses, each clock pulse having first and second transitions;
an address generator coupled to said clock signal source and operable to increment from a first address location to a next address location in response to said first transition of a clock pulse;
storage means coupled to said generator and said clock signal source, said storage means operable to store an address signal in response to said second transition of a prior clock pulse;
said address signal applied from said storage means to said memory register in response to said first transition.

13. The apparatus of claim 12, and further comprising:
a gate coupled to an output of said storage means, said gate operable to transmit said address signal to said memory register in response to said first transition.

14. The apparatus of claim 13, wherein said gate is operable to cease transmitting said address signal in response to a next second transition occurring after said first transition.

15. The apparatus of claim 12, wherein said first transition and said second transition have opposite polarities.

16. The apparatus of claim 15, wherein the interval between said second transition and a succeeding first transition is selected to allow the recovery of the address generator between address increments, said clock signal source originating said clock pulse responsive to a leading transition of a write command pulse, the minimum interval between two of the leading transitions equal to said clock pulse plus the time necessary to allow said address generator to recover.

17. The apparatus of claim 15, wherein said first transition is negative-going and the second transition is positive-going.

18. The apparatus of claim 12, and further comprising:
a plurality of address locations in said address generator including said first location, said next location and a last location;
said address generator operable to increment from said first address location successively through said address locations to said last address location, said address generator next incrementing back to said first address location.

19. The apparatus of claim 12, wherein said storage means comprises a plurality of transparent latches each coupled to a respective address location.

20. The apparatus of claim 12, wherein said address generator comprises a ring counter having at one location thereof a first bit of one polarity, the remaining locations containing a second bit of the opposite polarity;

said address generator operable to shift said first bit to an adjacent location responsive to said first transition.

21. The apparatus of claim 12, and further comprising a plurality of gates including said first gate, said gates each coupled to said storage means, said clock signal source and a respective memory register, a selected one of said gates receiving an inverse of said address signal from said storage means in response to said second transition, each said gate operable to transmit said address signal to a respective memory register in response to a first transition.

22. In a shift register memory system having a plurality of interconnected memory registers responsive to memory operations for writing data therein, a write controller comprising:

a write clock operable to produce a plurality of write clock pulses each having a first transition and a second transition opposite to said first transition;

a write address generator coupled to said clock and having a plurality of address locations, said generator responsive to said first transition to increment from a first address location to a next address location;

a plurality of transparent latches coupled to said clock and associated with respective locations in said generator, each latch operable to store a write signal from a respective address location responsive to a second transition; and a plurality of gates each coupled to said clock, a respective latch, and a respective memory register, each said gate permitting the transmission of a write signal to said memory register responsive to a first transition.

23. The write controller of claim 22, wherein each clock pulse is produced responsive to a leading transition of a write command, the width of said clock pulse determined by the amount of time necessary to write data into a memory register responsive to an address signal, the minimum interval between any two of said leading transitions equal to said clock pulse plus the time needed by said address generator to recover between increments.

24. The write controller of claim 22, wherein said first transition is negative-going and second transition is positive-going.

25. The write controller of claim 22, further comprising:

a read address generator for sequentially addressing each said memory register for reading data therefrom;

a comparator for comparing an address of said write address generator with an address of said read address generator to determine an equality of said addresses;

read and write storage means for storing an indication of the most recent of a read or a write operation of said memory; and a preventer for preventing a memory operation of said memory registers when said comparator determines equality of said read and write addresses and when said read and write storage means has stored therein an indication that the last memory operation was a predetermined operation of said memory system.

26. The write controller of claim 22, wherein said write address generator comprises a plurality of latches each coupled to said write clock, a first address bit stored in one of said latches, a second address bit of opposite polarity to said first address bit stored in the remainder of said latches, said address generator operable to shift said first address bit to an adjacent latch in response to a first transition.

27. The write controller of claim 22, wherein each said transparent latch has an input and an output, each said transparent latch operable to produce an inverse of said write signal at said output responsive to a first transition;

each said gate comprising a NOR gate operable to receive as one input thereof said write signal, said NOR gate operable to produce as its output said write signal responsive to a first transition.

* * * * *